United States Patent [19]

Corson et al.

[11] Patent Number: 4,807,353
[45] Date of Patent: Feb. 28, 1989

[54] RECIPROCATING TOOL SPINDLE AND TOOL CHANGER MECHANISM OPERABLE DURING SPINDLE BACKSTROKE

[75] Inventors: James R. Corson, Saline; Benjamin W. Hubbard, Brighton; Veryl F. Steinaway, Pinckney, all of Mich.

[73] Assignee: R & B Machine Tool Company, Saline, Mich.

[21] Appl. No.: 174,300

[22] Filed: Mar. 28, 1988

[51] Int. Cl.$^4$ ............................................ B23Q 3/157
[52] U.S. Cl. ..................................................... 29/568
[58] Field of Search ................. 29/568, 26 A; 408/11, 408/6, 710; 409/134, 194, 187

[56] References Cited

U.S. PATENT DOCUMENTS

| | | |
|---|---|---|
| 3,073,024 | 1/1963 | Hutchens et al. ...................... 29/568 |
| 3,133,349 | 5/1964 | Riedel .................................. 29/568 |
| 3,174,222 | 3/1965 | Pohl .................................... 29/568 |
| 3,973,863 | 8/1976 | Smith ............................. 29/26 A X |
| 4,608,645 | 8/1986 | Niwa et al. ...................... 29/568 X |
| 4,658,494 | 4/1987 | Ohtani ................................. 29/568 |
| 4,715,108 | 12/1987 | Sugiyama ............................. 29/568 |

FOREIGN PATENT DOCUMENTS

| | | |
|---|---|---|
| 3338308 | 5/1985 | Fed. Rep. of Germany ........ 29/568 |
| 164746 | 7/1986 | Japan ................................... 29/568 |
| 274832 | 12/1986 | Japan ................................... 29/568 |
| 1047649 | 10/1983 | U.S.S.R. ............................... 29/568 |

Primary Examiner—William Briggs
Attorney, Agent, or Firm—Reising, Ethington, Barnard, Perry and Milton

[57] ABSTRACT

A tool spindle in movable is a forward stroke toward a workpart and in a rearward stroke. A sensing device senses whether a tool chucked on the forward end of the spindle is damaged. A tool changer mechanism enters the rear of the spindle as the spindle moves rearwardly and inserts a replacement tool for the damaged tool in response to a signal from the sensing device indicating the tool is damaged. The next forward stroke of the spindle machines the workpart with the replacement tool. A replacement tool magazine and tool transfer mechanism are carried on a common slide with the spindle and are movable relative to the tool changer mechanism to transfer a replacement tool from the magazine to the tool changer mechanism.

27 Claims, 5 Drawing Sheets

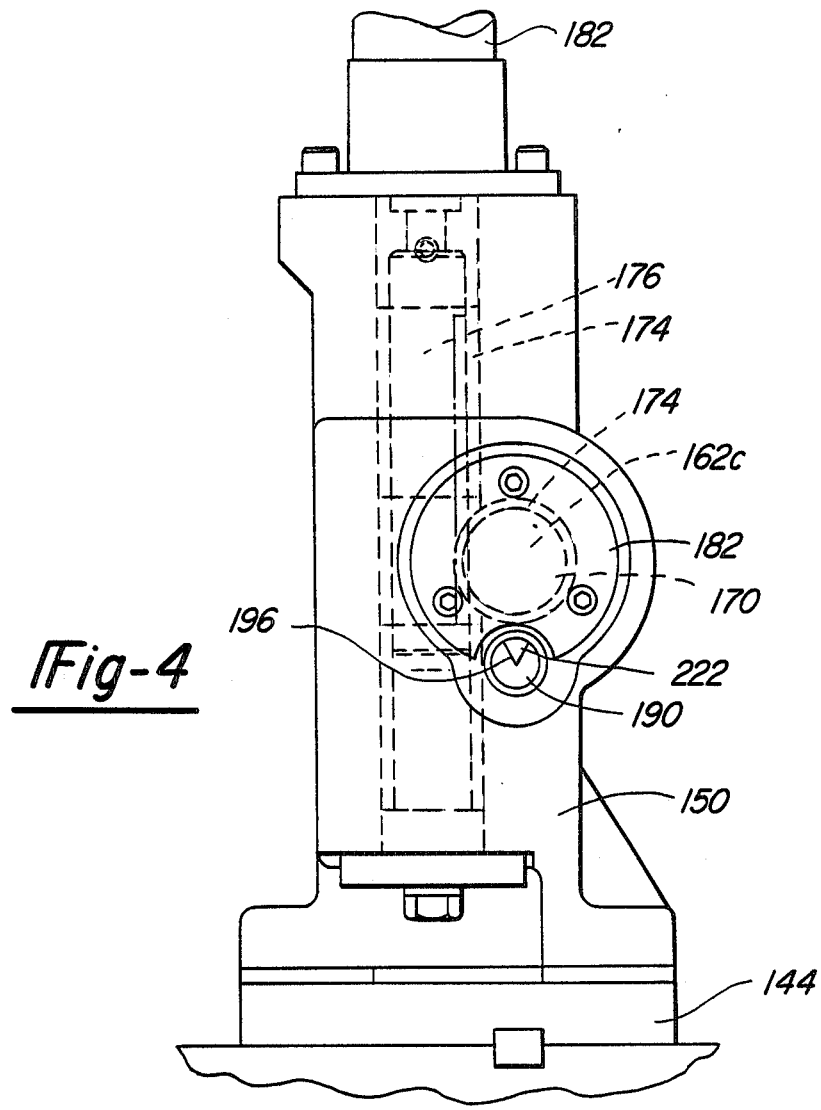
_Fig-4_
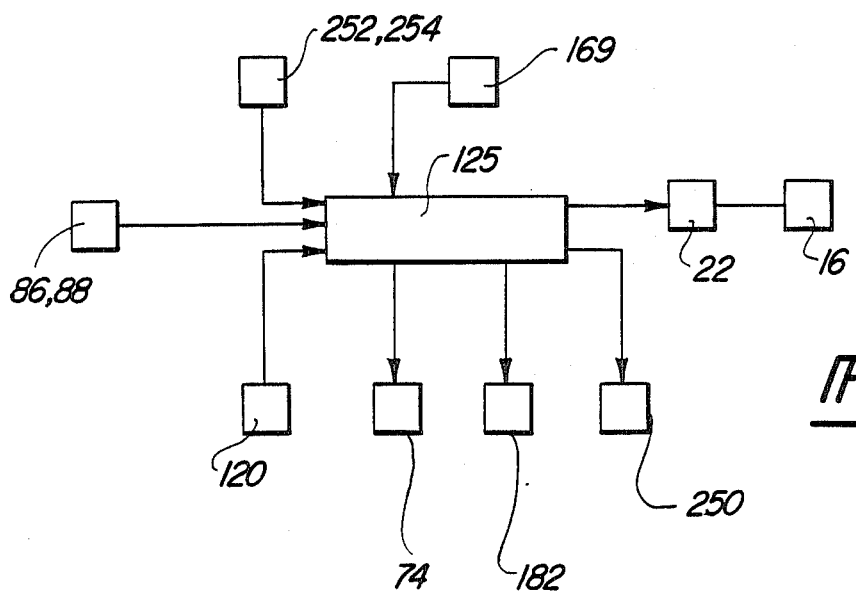
_Fig-5_

RECIPROCATING TOOL SPINDLE AND TOOL CHANGER MECHANISM OPERABLE DURING SPINDLE BACKSTROKE

FIELD OF THE INVENTION

The invention relates to a tool spindle and tool changer assembly having a tool spindle movable in a forward stroke toward a workpart and a rearward stroke and means for sensing a damaged tool and automatically replacing the damaged tool during the next rearward stroke such that no spindle strokes are lost as a result of tool replacement.

BACKGROUND OF THE INVENTION

Machine tools having tool changers to replace one type of tool with another type or to replace a worn tool with a new tool are known in the art.

U.S. Pat. Nos. 3,073,024; 3,133,349 and 3,174,222 illustrate machine tools for metalworking wherein a tool changer enters the rear of a vertically oriented and movable tool spindle. The tool changer is movable by a fluid cylinder relative to the spindle to insert a tool into the rear of the spindle and also to withdraw the tool from the spindle through its rear end. The tool changer also is moved relative to a tool storage chain or carousel to exchange tools therewith.

U.S. Pat. No. 4,658,494 discloses apparatus for drilling printed circuit boards wherein a drill bit transfer device pushes a drill bit of desired size from a tool holding magazine and transfers the selected drill bit to a position where it is aligned with the chuck or collet of a drilling unit for gripping by same. The apparatus includes a drill bit tip sensing device that interrupts operation of the apparatus when the device detects that the tip is incorrectly positioned.

SUMMARY OF THE INVENTION

The invention contemplates a tool spindle and tool changer assembly having a tool spindle movable in a forward stroke toward a workpart and in a rearward stroke away from the workpart, means for sensing whether a tool held in a chuck on the spindle is damaged, such as broken, and tool changer means disposed behind the spindle for entering a bore extending through the spindle to the chuck during the rearward stroke and responsive to the sensing means for inserting in the chuck a replacement tool for the damaged tool.

The invention also contemplates a tool spindle and tool changer assembly of the preceding paragraph including a replacement tool magazine that is movable with the spindle relative to the tool changer means to provide a supply of replacement tools.

The invention also contemplates a tool spindle and tool changer assembly of the preceding paragraphs including replacement tool transfer means movable with the spindle and tool magazine relative to the tool changer means for transferring a replacement tool from the magazine to the tool changer means for insertion in the chuck.

In a typical working embodiment of the invention, the tool spindle and tool changer assembly includes a slide on which the spindle is carried in a forward stroke toward a workpart and in a rearward stroke. The spindle includes a rotatable chuck on the forward end thereof for releasably holding a tool such as for example a drill bit. A longitudinal bore extends through the spindle from the forward end to the rearward end thereof.

A replacement tool magazine and tool transfer mechanism are carried on the same slide behind the spindle. The magazine includes a plurality of tools such as drill bits stacked vertically atop one another. The tool transfer member includes a rotatable transfer barrel positioned beneath the magazine to carry a replacement tool from the magazine to the tool changer mechanism which is disposed therebelow.

The tool changer mechanism comprises an elongate tool support member for receiving a replacement tool from the tool transfer member. The tool support member is disposed coaxial with the bore in the spindle and is located behind the spindle so that rearward spindle movement causes the tool support member to enter the bore. A tool pusher member is movable on the tool support member and also extends into the bore during the rearward stroke of the spindle.

The tool pusher member is actuated to insert the replacement tool received on the tool support member into the chuck in response to a signal from a sensing device that during the preceding forward stroke of the spindle has sensed that the tool chucked in the spindle is damaged.

In this way, the presence of a damaged tool in the spindle chuck is sensed during the forward stroke of the spindle and is replaced with a replacement tool during the rearward stroke in automatic fashion without loss or waste of spindle strokes in the machining cycle. The next forward stroke of the spindle will use the replacement tool to machine the workpart.

The sensing device can also sense for a damaged tool during the rearward stroke.

The invention also contemplates a method for replacing a damaged tool on a tool spindle with a replacement tool including the steps of moving the tool spindle in a forward stroke and a rearward stroke, sensing for a damaged tool, moving the spindle in a rearward stroke relative to a tool changer member such that the tool changer member enters the rear end of the spindle, and inserting a replacement tool in the chuck for the damaged tool in response to the sensing of the damaged tool.

BRIEF DESCRIPTION OF THE DRAWINGS

FIG. 4 is an elevation taken in the direction of arrow 4 in FIG. 2A.

FIG. 5 is a schematic view of the control system of the assembly.

BEST MODE FOR CARRYING OUT THE INVENTION

Figure 1:
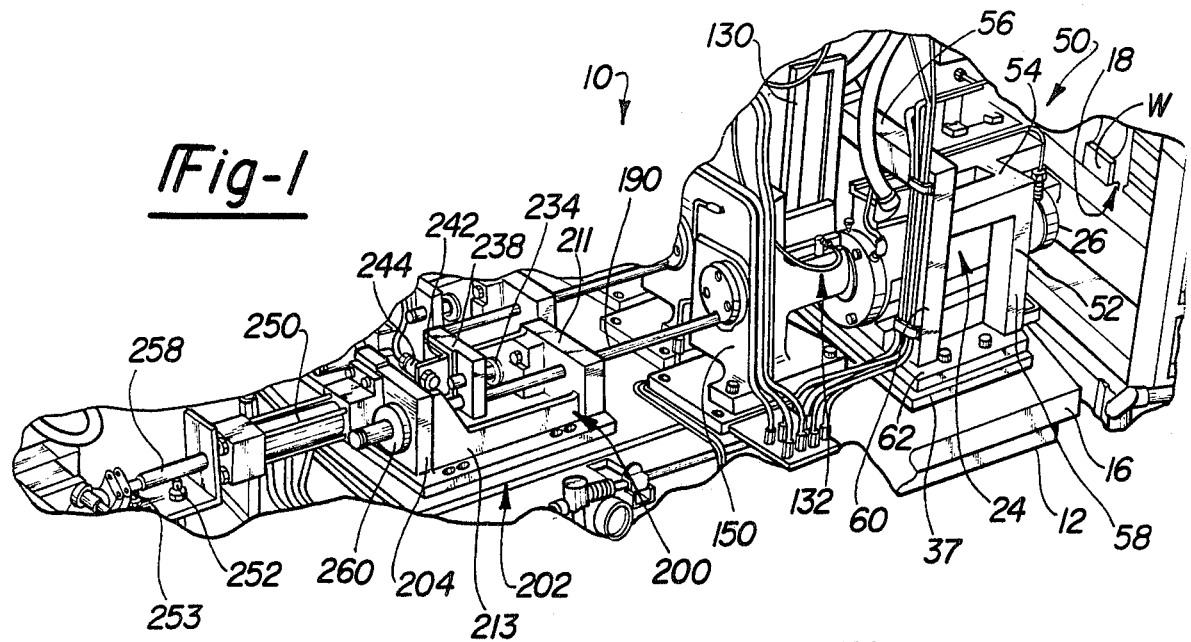
FIG. 1 is a partial perspective view of a tool spindle and tool changer assembly of the invention.

Referring to FIG. 1, a tool spindle and tool changer assembly 10 of the invention is illustrated as including a stationary base 12. A slide 16 is slidably disposed on base 12 for movement in a forward stroke toward a workpart fixture 18 and in a rearward stroke away therefrom. Slide 16 is moved in the forward stroke and rearward stroke by a conventional drive mechanism such as a ball screw 20 and D.C. servomotor 22, FIG. 2B.

The workpart fixture 18 is adapted to releasably hold a workpart W in front of a spindle assembly 23 carried on slide 16. Spindle assembly 23 includes a rotatable spindle 24 received for rotation in the spindle housing 32. Spindle 24 includes a forward end 26 having a chuck 28 for releasably holding a drill bit 30 for drilling hole in workpart W during the forward stroke. The spindle assembly is commercially available as model no. E-10833 from Setco Industries, Cincinnati, Ohio. Spindle housing 32 is attached onto a platform 36 of slide 16 by a plurality of machine screws 38, FIG. 2A. As mentioned, slide 16 moves the spindle 24 in a forward stroke toward fixture 18 to drill a hole in the workpart and in a rearward stroke away from the workpart.

During the rearward stroke, a new workpart W is releasably fixtured on fixture 18 for drilling or the same workpart is repositioned for drilling another hole in another location therein. Thus, the spindle machining cycle constitutes the forward stroke for drilling the workpart W and the rearward stroke for workpart changing.

Chuck 28 is of the spring type and is commercially available as model no. B-158269 from Erickson Tool Co., Solon, Ohio. Spring chuck 28 includes a central bore 40 to receive the drill bit 30 or other tool as shown best in FIG. 6. The shank of the drill bit is gripped by the spring biased chuck 28 to releasably hold the drill bit in position for drilling.

Figure 2A:
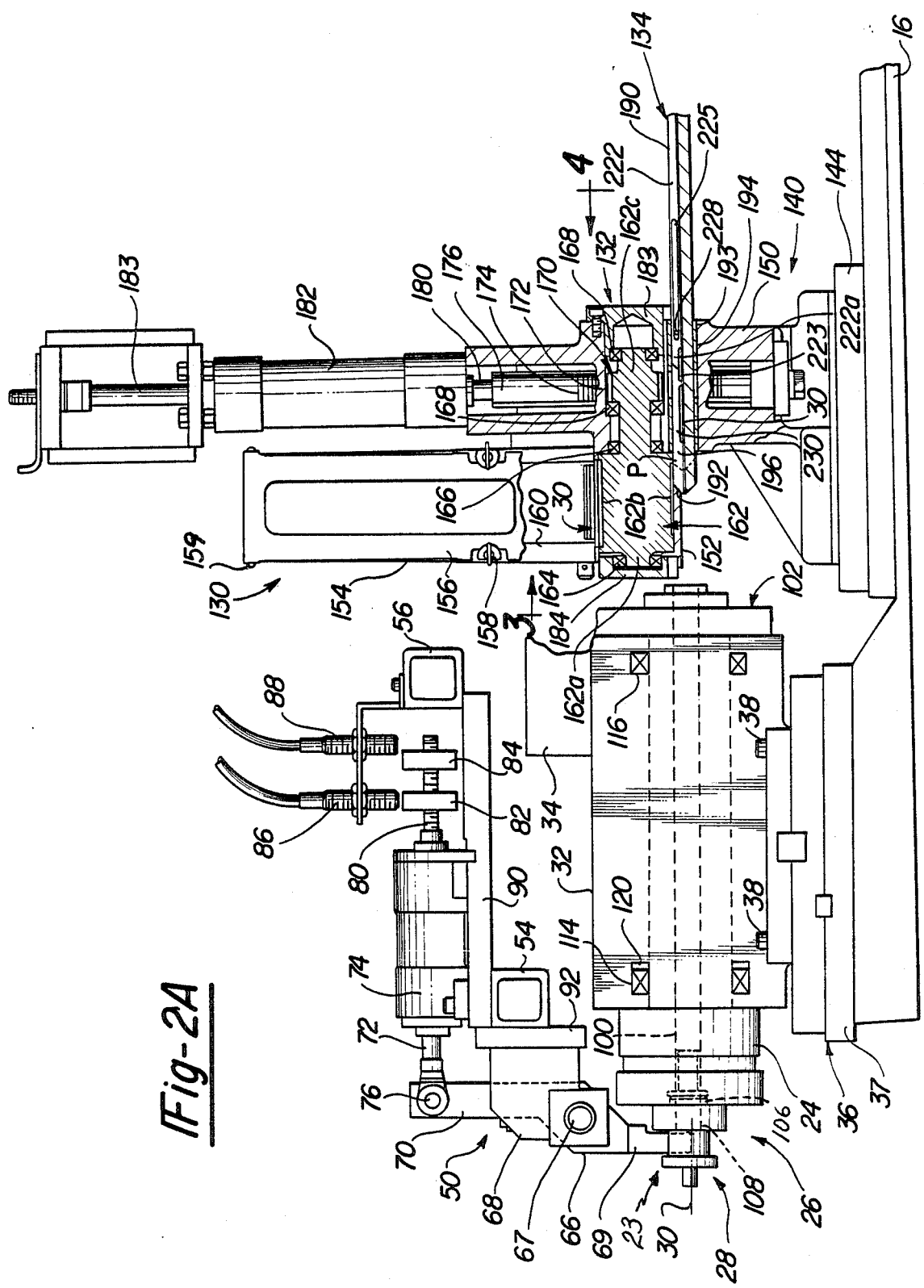
FIG. 2A is a longitudinal elevation with some portions in section of the front portion of the assembly.

A chuck actuating mechanism 50 is supported above the spindle by a frame 52 that straddles the spindle and is attached on slide 16 as shown best in FIGS. 1 and 2A. In particular, the frame includes horizontal frame members 54,56 and vertical frame members 58,60 on opposite sides of the spindle. The vertical frame members are connected to horizontal plate 62 which is attached by a plurality of machine screws (two shown) to plate 37 on slide 16.

The chuck actuating mechanism includes an actuating arm 66 that is pivotably mounted on shaft 67. Shaft 67 is disposed on bracket 68 supported on the horizontal frame member 54 as shown best in FIG. 2A. Actuating arm 66 includes a depending portion 69 to actuate the spring chuck to release the drill bit when portion 69 is pivoted clockwise in FIG. 2A. Actuating arm 66 includes an upstanding portion 70 that is connected to plunger 72 of cylinder 74 by pin 76. It is apparent that retraction of plunger 72 into the cylinder will cause depending portion 69 to pivot clockwise in an arcuate path to actuate the chuck to release the drill bit 30. When the plunger is in the extended position shown in FIGS. 2A and 6, the actuating arm will be disengaged from the chuck 28 so that the chuck can releasably hold the drill bit in position for drilling.

The plunger 72 carries a position indicating shaft 80 therewith extending out of the rear end of the cylinder opposite plunger 72. A pair of switch dogs 82,84 are carried on the shaft to actuate a respective switch 86,88 to indicate to the machine control unit 125, FIG. 5, whether the chuck is released by actuating arm 66 or operative to hold the drill bit for machining.

Cylinder 74 is supported by horizontal support plate 90 welded between horizontal front members 54,56. Bracket 68 is supported by vertical support plate 92 welded to horizontal frame member 54.

Figure 6:
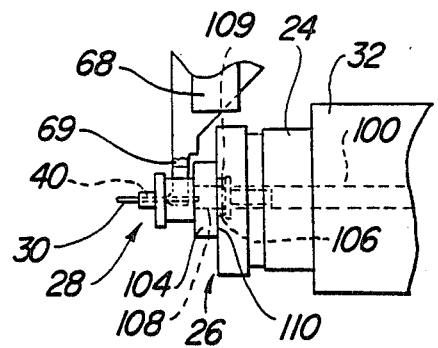
FIG. 6 is an elevation of the forward end of the spindle.

Spindle 24 includes forward end 26 having spring chuck 28 thereon and a longitudinal cylindrical bore 100 extending from the forward end to rear end 102 of the spindle. Chuck 28 is mounted on the forward end of the spindle by collar 104 and shank 106 with shank 106 received in counterbore 109 in the forward end of the spindle, FIG. 6. Collar 104 can be secured to the forward end of the spindle by a plurality fasteners (not shown). Collar 104 and shank 106 include longitudinal bore 10 coaxial with bore 100. Bore 108 extends to the rear side 110 of the collar as shown in FIGS. 2A and 6 where it communicates with bore 100. Bore 100 and 108 are equal in diameter.

Spindle 24 is rotatably mounted in spindle housing 32 by front and rear antifriction bearings 114,116. A thrust sensor 120 is disposed adjacent front or rear bearings 114,116 to sense thrust load on the respective bearing during drilling of the workpart. Thrust sensor 120 is of conventional type and provided with the commercially workable spindle referred to hereinabove. Thrust sensor 120 outputs an electrical signal representative of the thrust load on the spindle bearing to a machine control 125 for purposes to be explained. Control unit 125 may be a programmable computer control unit.

During the forward stroke of the spindle into the workpart to drill a hole, the drill bit being small in diameter (e.g., 1 mm) may break off or otherwise be damaged. If the drill bit breaks off, the thrust load on spindle 28 will decrease significantly. Thrust sensor 120 is selected to provide a signal to control unit 125 when the thrust load decreases significantly to a level known empirically to be caused by a broken drill bit.

When control unit 125 receives such a signal from the thrust sensor, the control unit initiates a procedure during the next rearward stroke of the spindle to replace the damaged drill bit using a replacement tool magazine 130, tool transfer mechanism 132 and tool changer mechanism 134.

The tool magazine and tool transfer mechanism are mounted on upstanding frame 140 fixedly attached to shim plate 144. Shim plate 144 is fixedly attached to slide 16 by suitable means.

In particular, frame 140 includes a pedestal 150 and a hollow tubular housing 152 extending forwardly therefrom. Mounted atop the tubular housing is replacement tool magazine 130 in the form of an elongate container 154 in which a plurality of replacement drill bits are stacked one atop the other. Door 156 is provided on one side of the container for access thereto to load the container. Thumb screws 158 are provided to secure door 156 closed. Door 156 is hinged at the top of the container by hinge pin 159.

The container 154 defines a channel 160 therein having a width to receive replacement drill bits 30. Channel 160 opens at the bottom to a tool transfer member 162 rotatably mounted in the tubular housing 152 by antifriction bearings, 164 and in the pedestal by similar bearings 168.

Figure 3:
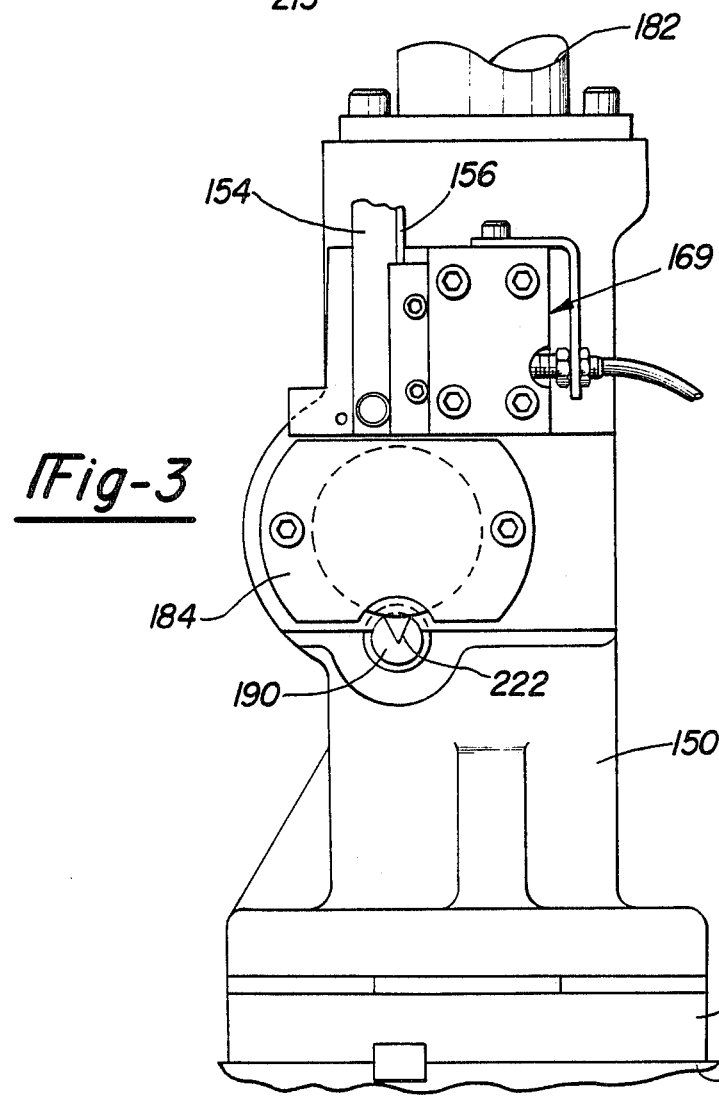
FIG. 3 is an elevation taken in the direction of arrow 3 in FIG. 2A.

A fiber optic switch or sensor 169 is positioned on the door 156 of the tool container to sense the level of drill bits 30 in channel 160, FIG. 3.

As shown best in FIG. 2A, the tool transfer member 162 includes a large diameter barrel 162a having a first (upper) and second (lower) slot 162b therein spaced apart on opposite diametrical sides of the barrel. The slots are sized to receive a replacement tool bit exiting the open bottom of channel 160 of the tool magazine.

The tool transfer member also includes longitudinal smaller diameter shaft 162c extending rearwardly to bearings 168. Shaft 162c includes a pinion 170 thereon. Pinion 170 includes teeth 172 that are adapted to mesh with teeth 174 on a linearly reciprocating rack 176 that is movable up and down in a vertical passage in pedestal 150.

Rack 176 is moved by plunger 180 of cylinder 182 supported atop pedestal 150. Cylinder 182 includes a position indicating shaft 183 that carries a pair of dogs (not shown) relative to a pair of stationary sensors (not shown) in a similar arrangement as shown for cylinder 74 to input position of plunger 180 to control unit 125.

Movement of rack 176 past pinion 170 with their teeth engaged effects rotation of tool transfer barrel 162a. In particular, when control unit 125 receives the signal from thrust sensor 120 indicative of a broken drill bit, the control unit actuates cylinder 182 to move rack 176 past pinion 170 to an extent to cause barrel 162a to rotate 180° to position the upper slot 162b having a replacement drill bit therein on the bottom and empty lower slot 162b on the top adjacent tool magazine 130 to receive another drill bit therefrom. As will be explained, the drill bit in the slot moved to the bottom position falls by gravity onto tool changer mechanism 134 for insertion in the chuck of the spindle.

Opposite ends of tubular housing 152 are closed by end caps 183,184.

From FIG. 2A, it is apparent that tool magazine 130 and tool transfer mechanism 132 are positioned behind the rear end of spindle 24 and move with the spindle on common slide 16 in a rearward stroke as part of the typical machine cycle.

Tool changer mechanism 134 includes elongate replacement tool support member 190 spaced behind the spindle and positioned to enter bore 100 as the spindle moves rearwardly during its normal rearward stroke. The tool support member includes a forward end 192 that extends through and is supported by a bushing 193 in longitudinal bore 194 in pedestal 150 to this end. Tool support member 190 has a cylindrical outer profile with a V-shaped slot 196 therein for purposes to be explained. The tool support member is substantially coaxial with bore 100 in the spindle. Bushing 193 and tool support member 190 are relatively slidable during the rearward stroke of spindle 24.

Figure 2B:
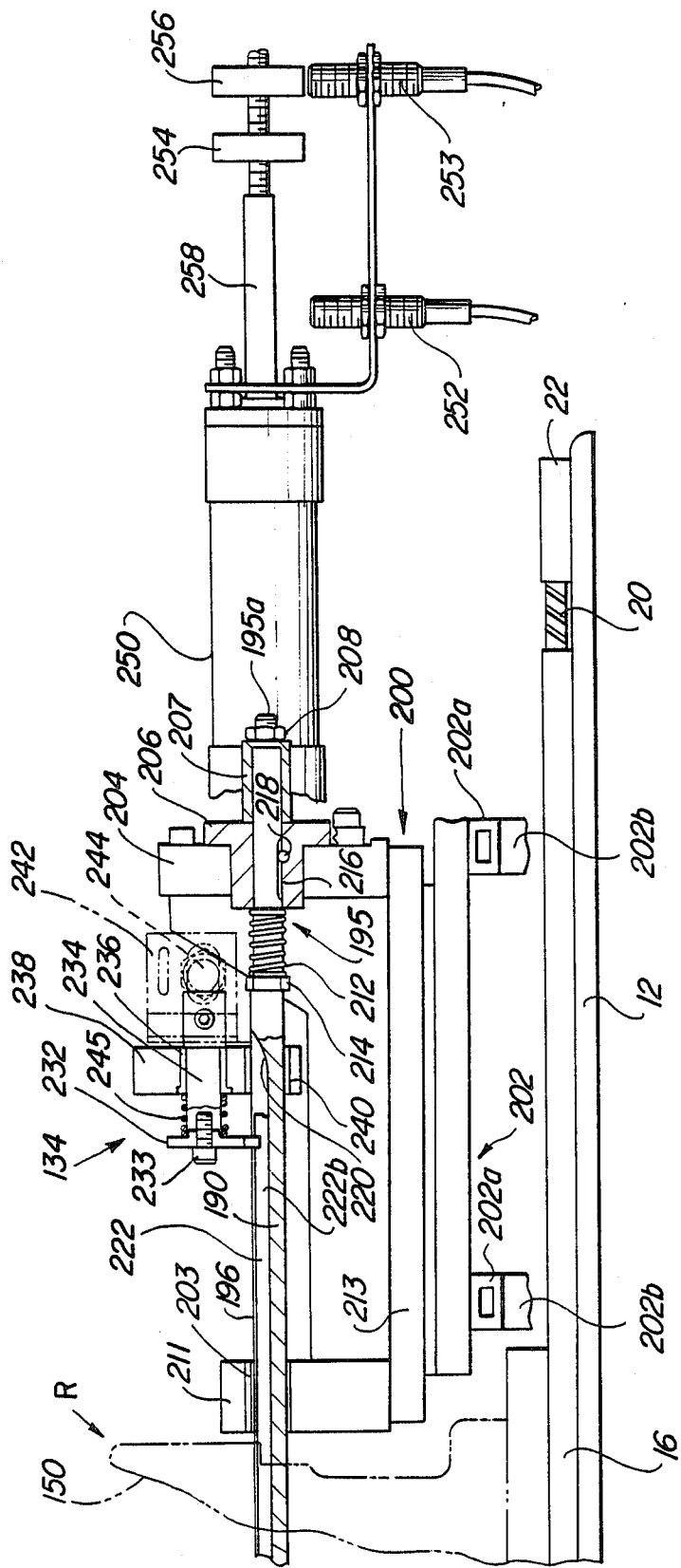
FIG. 2B is a longitudinal elevation of the rear portion of the assembly with some portions in section and, if mated at the break away line with FIG. 2A, provides a full longitudinal view of the tool spindle and tool changer assembly.

Tool support member 190 is held in the axially-extending position shown in FIG. 2A by a rear frame 200 mounted on a second base 202 that straddles first base 12, FIG. 2B. Second base 202 includes horizontal members 202a and vertical members or legs 202b that extend to the floor.

Rear frame 200 includes a vertical rear frame member 204 on which the rear end 195 of the tool support member is slidably secured. The rear end 195 of the tool support member includes a reduced diameter end slidably received in collar 206. A sleeve 207 and jam nut 208 are carried on the rear end 195 outboard of frame member 204. Jam nut 208 is threadably engaged on threaded end 195a of the tool support member. A coil spring 212 is positioned between annular flange 214 on the rear end of the tool support member and collar 206 to allow the tool support 190 to be slidably displaced rearwardly against spring bias to the phantom position P shown in FIG. 2A by engagement of forward end 192 thereof against the rear side of chuck 28 as the spindle tool magazine 130, and tool transfer mechanism 132 move rearwardly to the position shown in phantom in FIG. 2B.

A longitudinal slot 216 is provided in rear end 195 to receive a dowel pin 218 in collar 206 to allow longitudinal sliding movement of tool support member 190 without rotation thereof.

Tool support member 190 extends through and is supported by a bushing 203 in vertical front frame member 211. Horizontal frame member 213 supports and interconnects vertical frame members 204 and 211.

V-shaped slot 196 extends from the forward end of tool support member 190 toward the rear end o and terminates at a curvilinear end 220.

Slidably positioned in V-shaped slot 196 is a tool pusher member 222 having a complementary V-shaped cross-section to slot 196, FIG. 4. Forward end 222a of the pusher member includes an elongate rectangular nose 223 attached thereon and also a longitudinal slot 225 to receive a dowel pin 228 extending transversely from tool support member 190 to prevent rotation of the pusher member. As is apparent from FIG. 2A, forward end 222a of the pusher member stops short of the forward end of the tool support member to define a pocket 230 in front of nose 223 to receive a replacement drill bit from tool magazine 130 when the pocket 230 is aligned therebeneath during the rearward stroke of spindle 24 and when transfer barrel 162 is rotated by rack 176 as will be explained.

Rear end 222b of the tool pusher member has connector plate 232 fixedly attached thereto. Connector plate 232 in turn is attached by screw 233 to post 234 which is received in bushing 236 in push plate 238. Push plate 238 includes another bushing 240 through which the rear end of tool support member 190 extends as shown best in FIG. 2B.

An L-shaped plate 242 is attached on the rear side of push plate 238 and carries a proximity sensor 244. A coil spring 245 is positioned between connector plate 232 and the front side of push plate 238. Post 234 is adapted to move relative to push plate 238 against the bias of spring 245 in the event the replacement drill bit in pocket 230 hangs up in bore 100 or 108. Post 234 actuates proximity switch 244 in this event to send a signal to control unit 125 to stop further advance of the tool pusher member to avoid damage thereto.

Push plate 238 is moved forwardly and rearwardly by cylinder 250 having its plunger (not shown) connected to push plate 238. Of course, movement of push plate 238 effects movement of tool pusher member 222 on tool support member 190.

The position of the plunger of cylinder 250 is sensed by proximity switches 252,253 suspended from the rear of the cylinder and past which switch dogs 254,256 move. Switch dogs 254,256 are carried on shaft 258 that moves with the plunger of cylinder 250.

Actuation of cylinder 250 is controlled by control unit 125 as will be explained.

In operation of the tool spindle and tool changer assembly illustrated in the Figures and described hereinabove, slide 16 is moved in a forward stroke toward workpart fixture 18 to advance spindle 24 and drill bit 30 to drill a hole in workpart W. After the proper depth of hole is drilled, the spindle is moved in the rearward stroke by slide 16 to withdraw the drill bit from the workpart and to allow another workpart to be fixtured for drilling or the same workpart repositioned for drilling another hole therein at another location upon the next forward stroke. During the normal rearward stroke, tool support member 190 enters bore 100 of the spindle and pusher member 222 is not actuated by the control unit 125. Tool transfer mechanism 132 also is not actuated by the control unit.

However, if the drill bit is damaged, such as broken, during any forward stroke of the spindle, thrust sensor 120 sends the appropriate signal to control unit 125 indicating the presence of a broken tool.

In one mode of operation, during the next rearward stroke of the spindle, control unit 125 actuates tool transfer mechanism 132 to supply a replacement drill bit from tool magazine 130 to pocket 230 in the tool support member at such time as the barrel 162a of the tool transfer mechanism is aligned over the pocket 230 during the rearward stroke of the spindle. In particular, cylinder 182 is actuated to move rack 176 past pinion 170 to rotate the barrel 180° to drop a replacement drill bit received from the tool magazine in pocket 230.

Alternatively and preferably, replacement tool transfer is effected to insure that a replacement drill bit is always present in pocket 230, i.e., a replacement tool drill bit is transferred to pocket 230 before the first forward stroke of the spindle and immediately following each insertion of a replacement drill bit in chuck 28.

Regardless of the timing of tool transfer to pocket 230, as the spindle continues its rearward stroke to the position shown in phantom in FIG. 2B, tool support member 190 with the replacement bit in pocket 230 and pusher member 222 enter bore 100. As spindle 24 approaches the phantom position R (extreme rearward position, FIG. 2B), the rear side of chuck 28 abuts the front end 192 of tool support member 190 and moves it to the phantom position P of FIG. 2A against bias of coil spring 212. With the spindle and support member 190 at their rearwardmost positions shown in FIG. 2B, control unit 125 actuates cylinder 250 to advance tool pusher member 222 forwardly to push the replacement drill toward chuck 28 through bores 100,108. Control unit 125 controls movement of slide 16 to provide the aforementioned spindle movements.

Prior to actuation of cylinder 250, control unit 125 will have actuated cylinder 74 to cause chuck actuating arm 66 to release the damaged drill bit in bore 40.

Cylinder 250 will advance tool pusher member 222 the desired distance forwardly to insert the replacement drill bit in the chuck as determined by proximity switches 252,253 which provide feedback to the control unit. Once the replacement drill bit is inserted in the chuck, the cylinder 250 will be reversed by the control unit to its original position as a result feedback from proximity switches 252,253.

Also, once the drill bit is in proper position, the control unit will cause chuck actuating arm 66 to permit the spring chuck to grip the replacement drill bit as the spindle begins its next forward stroke toward the workpart to machine same with the replacement drill bit in the chuck. The machine tool can then operate in normal cyclic fashion until the replacement drill bit breaks.

Thus, a damaged drill bit is sensed on the forward stroke and replaced on the rearward stroke of spindle 24 without lose of any spindle strokes and without interruption in the machining cycle.

Should the replacement drill bit get hungup in bore 100,108 or fail to enter the chuck for some reason, coil spring 245 will be compressed between connector plate 232 and push plate 238 and post 234 will actuate sensor 244. Actuation of sensor 244 informs control unit 125 that further actuation of plunger 250 should be stopped. This prevents damage to pusher member 222.

The tool spindle and tool changer assembly of the invention can include multiple spindles positioned side-by-side each with its own tool magazine 130, tool transfer mechanism 132 and tool changer 134 as described hereinabove With the spindles mounted on a common slide to simultaneously drill multiple holes on the forward stroke.

Figure 7:
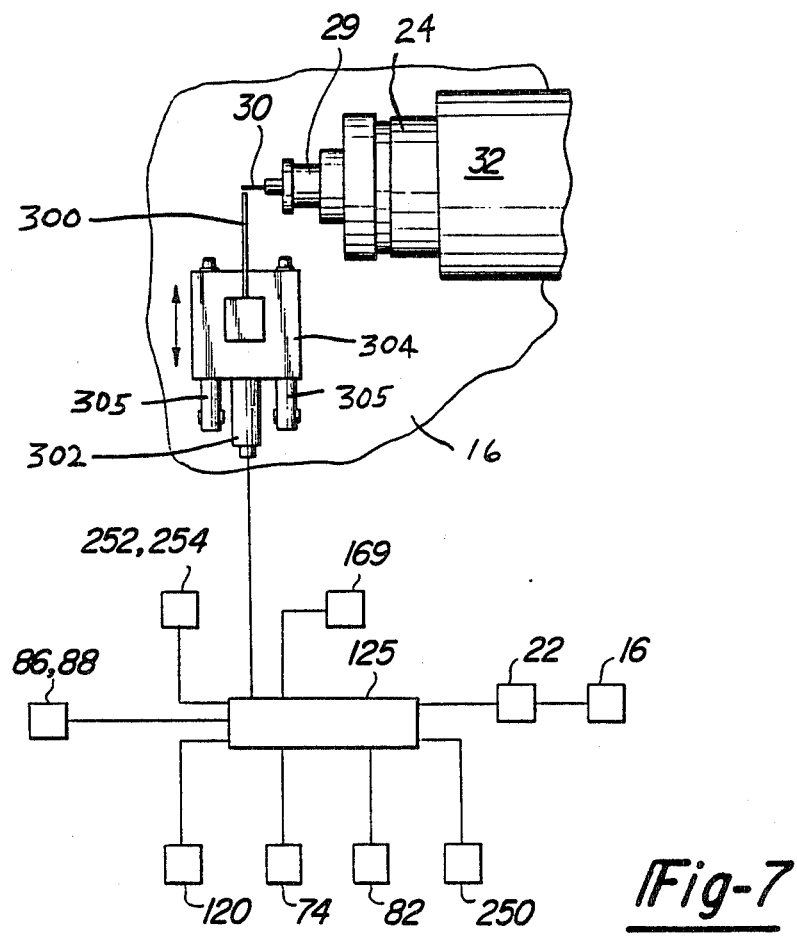
FIG. 7 is a longitudinal elevation of another embodiment of the tool spindle and tool changer assembly of the invention.

Another embodiment of the invention is shown in FIG. 7 wherein like reference numerals are used for like components shown in FIGS. 1-6. The embodiment of FIG. 7 differs from that described hereinabove in that sensing for a damaged tool is effected on the rearward stroke, not the forward stroke as described above. In particular, sensing for a damaged tool occurs at the end of the rearward stroke prior to initiation of the next forward stroke. Sensing for the damaged tool is accomplished by a sensing probe 300 that is mounted for movement toward and away from the drill bit 30. The probe 300 is mounted on the slide 304 which is slidably mounted on rails 305. Rails 305 are secured on slide 16 for movement therewith. The probe 300 and slide 304 can be moved by a cylinder 302 on the slide 16 to move in a direction perpendicular to the longitudinal axis of the drill bit to attempt to sense a portion of the drill bit; e.g., the drill bit tip. The probe 300 may comprise a mechanical, pneumatic, or electrical probe known in the art. The probe 300 may actuate a microswitch (not shown) or otherwise generate an electrical signal indicating that the drill bit is damaged; e.g., broken off. The probe 300 generates the signal when it is moved on rails 305 in an attempt to contact or sense a portion (e.g., tip) of the drill bit that is not present as a result of breaking off.

The electrical signal generated by the probe 300 is input to control unit 125 (FIG. 5). When the control unit receives such a signal, the control unit actuates cylinder 250 to advance tool pusher member 222 forwardly to push the replacement drill in pocket 230 toward chuck 28 through bores 100,108. Prior to actuation of cylinder 250, control unit 125 will have actuated cylinder 74 to cause chuck actuating arm 66 to release the damaged drill bit for dislodgement by the replacement drill bit as described hereinabove for FIGS. 1-6. Once the replacement drill bit is properly positioned in chuck 28, the control unit will cause chuck actuating arm 66 to permit the spring chuck to grip the replacement drill bit as the spindle begins its next forward stroke toward the workpart.

Those skilled in the art will appreciate that sensing for a damaged drill bit can take place during the rearward stroke before the spindle reaches the end of its rearward stroke and as the spindle is moving rearwardly.

While the invention has been described in terms of specific embodiments thereof, it is not intended to be limited thereto but rather only to the extent set forth hereinafter in the following claims.

We claim:

1. A tool spindle and tool changer assembly comprising a spindle having a forward end for releasably holding a tool, a rear end and a bore extending between the ends, means for moving the spindle in a forward stroke toward a workpart and in a rearward stroke away from the workpart, means for sensing whether the tool is damaged, and tool changer means disposed behind the spindle for entering said bore through said rear end during the rearward stroke and responsive to said sensing means for inserting a replacement tool for the damaged tool.

2. The assembly of claim 1 further including a replacement tool magazine behind the spindle and movable with the spindle relative to the tool changer means.

3. The assembly of claim 2 further including replacement tool transfer means movable with the spindle and magazine for transferring a replacement tool from the magazine to the tool changer means in response to said sensing means.

4. The assembly of claim 3 wherein the tool transfer means is disposed between the magazine and tool changer means.

5. The assembly of claim 4 wherein the tool transfer means is rotatable to transfer a replacement tool from the magazine to the tool changer means.

6. The assembly of claim 1 further including a chuck on the forward end and means for actuating the chuck to release the damaged tool to allow dislodgement of the damaged tool by the replacement tool and to hold the replacement tool inserted therein.

7. The assembly of claim 1 wherein the sensing means moves with the spindle during the forward stroke and rearward stroke.

8. The assembly of claim 8 wherein the sensing means comprises a thrust sensor.

9. The assembly of claim 8 wherein the sensing means comprises a probe for sensing the presence of the tool.

10. A tool spindle and tool changer assembly comprising a spindle having a forward end with a chuck for releasably holding a tool, a rear end and a bore extending between the ends, means for moving the spindle in a forward stroke toward a workpart and in a rearward stroke away from the workpart, means for sensing during the forward stroke whether the tool is damaged, and tool changer means disposed behind the spindle for entering said bore through said rear end during the rearward stroke and responsive to said sensing means for inserting in the chuck a replacement tool for the damaged tool.

11. A tool spindle and tool changer assembly comprising:
 (a) a spindle having a forward end with a chuck for releasably holding a tool, a rear end and a bore extending between said ends,
 (b) slide means on which the spindle is moved in a forward stroke to carry the tool toward a workpart and in a rearward stroke to carry the tool away from the workpart,
 (c) means for sensing whether the tool is damaged,
 (d) tool changer means disposed behind the spindle for entering said bore through said rear end during the rearward stroke and responsive to said sensing means for inserting in the chuck a replacement tool for the damaged tool during the rearward stroke, and
 (e) a replacement tool magazine and tool transfer member carried on said slide means for movement with the spindle relative to said tool changer means, said tool transfer member transferring a replacement tool from the tool magazine to the tool changer means.

12. The assembly of claim 11 wherein tool transfer member is disposed between the tool magazine and tool changer means.

13. The assembly of claim 12 wherein the tool transfer member is a rotatable transfer member.

14. The assembly of claim 11 further including means for actuating the chuck to release the damaged tool to allow dislodgement of the damaged tool by the replacement tool and to hold the replacement tool inserted therein.

15. The assembly of claim 11 including a pivotal gate member on the forward end of the spindle for guiding the replacement tool into the chuck and for closing off the bore behind the replacement tool once the replacement tool is inserted in the chuck.

16. A tool spindle and tool changer assembly comprising:
 (a) a spindle having a forward end with a chuck for releasably holding a tool, a rear end and a bore extending between the ends,
 (b) means for moving the spindle in a forward stroke toward a workpart and in a rearward stroke away from the workpart,
 (c) means for sensing during the forward stroke whether the tool is damaged, and
 (d) tool changer means disposed behind the spindle, said tool changer means including an elongate replacement tool support member positioned to enter said bore through said rear end during the rearward stroke and to support a replacement tool thereon and a pusher member disposed on the support member for movement in response to said sensing means for pushing the replacement tool on the support member into the chuck to replace the damaged tool during the rearward stroke.

17. The assembly of claim 16 further including a replacement tool magazine containing multiple replacement tools and movable with the spindle relative to the replacement tool support member.

18. The assembly of claim 17 further including replacement tool transfer member movable with the magazine for transferring a replacement tool from the magazine to the replacement tool support member when they are aligned during the rearward stroke.

19. The assembly of claim 18 wherein the transfer member comprises a rotatable transfer barrel between the magazine and replacement tool support member for receiving a replacement tool from the magazine and depositing it on the support member.

20. The assembly of claim 18 wherein the spindle magazine and transfer member are movable on a common slide together and relative to the replacement tool support member.

21. The assembly of claim 16 wherein the replacement tool support member includes a forward end that is supported on said common slide which moves relative to said support member.

22. A method for replacing a damaged tool on a forward end of a tool spindle with a replacement tool comprising:
 (a) moving the tool spindle in a forward stroke to advance the tool toward a workpart and in a rearward stroke away from a workpart,
 (b) sensing whether the tool is damaged, and (c) moving the spindle in a rearward stroke away from the workpart and relative to a tool changer member so that the tool changer member enters the rear end of the spindle and inserts a replacement tool for the damaged tool in response to sensing of the damaged tool.

23. The method of claim 22 further including transferring during the rearward stroke a replacement tool from a replacement tool magazine to the tool changer member in response to the sensing of the damaged tool.

24. The method of claim 23 including moving the replacement tool magazine with the spindle during the rearward stroke.

25. The method of claim 22 including pushing the replacement tool through the spindle toward the forward end such that the replacement tool dislodges the damaged tool as the replacement tool is pushed onto the forward end.

26. The method of claim 22 including sensing during the forward stroke whether the tool is damaged.

27. The method of claim 22 including sensing during the rearward stroke whether the tool is damaged.

* * * * *

UNITED STATES PATENT AND TRADEMARK OFFICE
CERTIFICATE OF CORRECTION

PATENT NO. : 4,807,353

DATED : February 28, 1989

INVENTOR(S) : James R. Corson, Benjamin W. Hubbar and Veryl F. Steinaway

It is certified that error appears in the above-identified patent and that said Letters Patent is hereby corrected as shown below:

Title page, line 1 of the Abstract, delete "in movable is" and insert --is movable in--. Column 3, line 18, after "drilling" insert --a--. Column 4, line 16, after "plurality" insert --of--. Column 4, line 18, delete "10" and insert --108--. Column 6, line 20, delete "o". Column 7, line 58, after "result" insert --of--. Column 8, line 14 delete "With" and insert "with".

Signed and Sealed this

Nineteenth Day of February, 1991

Attest:

HARRY F. MANBECK, JR.

*Attesting Officer*     *Commissioner of Patents and Trademarks*